US006935785B2

(12) United States Patent
Kato

(10) Patent No.: US 6,935,785 B2
(45) Date of Patent: Aug. 30, 2005

(54) LINEAR GUIDE RAIL AND LINEAR GUIDE ROLLING DIE

(75) Inventor: Soichiro Kato, Saitama (JP)

(73) Assignee: NSK Ltd., Tokyo (JP)

( * ) Notice: Subject to any disclaimer, the term of this patent is extended or adjusted under 35 U.S.C. 154(b) by 69 days.

(21) Appl. No.: 10/321,809

(22) Filed: Dec. 18, 2002

(65) Prior Publication Data

US 2003/0123762 A1 Jul. 3, 2003

(30) Foreign Application Priority Data

Dec. 19, 2001 (JP) ..................................... P.2001-386639

(51) Int. Cl.[7] ................................................ F16C 29/04

(52) U.S. Cl. ............................................ 384/45; 384/49

(58) Field of Search ............................... 384/43, 45, 49

(56) References Cited

U.S. PATENT DOCUMENTS 4,898,478 A 2/1990 Osawa
2003/0123761 A1 * 7/2003 Kawashima et al. .......... 384/45

FOREIGN PATENT DOCUMENTS

| | | |
|---|---|---|
| EP | 0 846 880 A1 | 6/1998 |
| FR | 2 605 369 A | 4/1988 |
| JP | 2001-227539 | 8/2001 |

* cited by examiner

*Primary Examiner*—William C. Joyce
(74) *Attorney, Agent, or Firm*—Sughrue Mion, PLLC

(57) ABSTRACT

A linear guide rail has: a rail body, straight-line ball rolling grooves being formed in surfaces of the rail body by form rolling, wherein curved corners are formed at joint portions between the surfaces of the rail body and the ball rolling grooves, the curved corners connecting smoothly the surface of the rail body to that of the ball rolling grooves.

10 Claims, 8 Drawing Sheets

LINEAR GUIDE RAIL AND LINEAR GUIDE ROLLING DIE

BACKGROUND OF THE INVENTION

1. Field of the Invention

The present invention relates to technique used for forming a ball rolling groove in a guide rail material of a linear guide by form rolling.

2. Description of the Related Art

A guide rail of a linear guide is generally produced by a method having the steps of: drawing a guide rail material of iron or steel out so as to be formed into a predetermined shape; and grinding ball rolling grooves formed in surfaces (e.g., side surfaces) of the guide rail material, on a grind stone. To obtain an accurate guide rail by this method, it is however necessary that the machining allowance for grinding the ball rolling grooves is selected to be a little bit great, and the grinding of the ball rolling grooves is repeated. This causes elongation of the machining time and increase in the production cost of the guide rail.

Therefore, a method using a rolling die D as shown in FIG. 11 for forming ball rolling grooves in a guide rail material by form rolling to thereby produce a guide rail disposed in JP-A-2001-227539.

According to the method, the production cost of the guide rail can be reduced because it is unnecessary to repeat grinding of the ball rolling grooves but there is the possibility that the following problem may occur. That is, when the rolling die D shown in FIG. 11 is simply used for forming ball rolling grooves in a guide rail material by form rolling (in the condition that the die (form rolling roll) is not applied to side surfaces of the rail), joint portions (A in FIG. 12) between each ball rolling groove G formed in the guide rail material W by form rolling and a surface of the guide rail material are apt to be swollen like edges, as shown in FIG. 12. For this reason, there is the possibility that a ball may collide with the joint portions when the ball enters a load portion of a slider. Hence, there is fear that stress produced by collision of the ball with the joint portions may be concentrated into the edges of the joint portions to thereby lower durability of the guide rail. There is also fear that abrasion of a side seal mounted on the slider may be accelerated to thereby lower the function of the side seal.

SUMMARY OF THE INVENTION

Therefore, in consideration of the problem, an object of the invention is to provide a rolling die for a linear guide which can be used for forming a ball rolling groove in a guide rail material by form rolling without causing lowering in durability of a guide rail and without causing lowering in the function of a side seal. Another object of the invention is to provide a linear guide rail in which stress can be restrained from being concentrated into joint portions between each ball rolling groove formed in a rail body by form rolling and a surface of the rail body, and a linear guide device using the linear guide rail.

(1) In order to achieve the objects, according to the invention, there is provided a linear guide rail comprising: a rail body, straight-line ball rolling grooves being formed in surfaces of the rail body by form rolling, wherein curved corners are formed at joint portions between the surfaces of the rail body and the ball rolling grooves, the curved corners connecting smoothly the surface of the rail body to that of the ball rolling grooves.

In the above construction, it is preferable that a center of curvatures of the curved corner is disposed in an opposite side of that of the ball rolling grooves with respect to the surface of the rail body.

(2) According to the invention, in the linear guide rail as in (1), a curvature radius of the curved corners is selected to satisfy the relation $|r_1|<|r_2|$ in which $r_1$ is the curvature radius of the curved corners, and $r_2$ is a curvature radius of the ball rolling grooves.

(3) According to the invention, in the linear guide rail as in (1) or (2), the curved corners satisfy the condition:

$$L_A \geq \frac{\left(\alpha - \cos^{-1}\left(\frac{2f-1}{2f}\sin\alpha\right)\right)\times\pi\times f\times Da}{180} + a_0$$

$$a_0 = \mu\sqrt[3]{\frac{3\left(1-\frac{1}{m^2}\right)Q_0}{E\cdot\sum\rho}}$$

$$Q_0 = 2\cdot\left(\frac{f}{2f-1}\right)^{\frac{1}{2}}Da^2$$

$$\sum\rho = \frac{4f-1}{Daf}$$

$\mu$: Hertz's coefficient

1/m: Poisson's ratio

E: Young's modulus in which Da is a diameter of each of balls rolling in the ball rolling grooves, f is a ratio of the curvature radius of each of the ball rolling grooves to the ball diameter, $\alpha$ is a contact angle between each of the ball rolling grooves and a corresponding one of the balls, and $L_A$ is a distance from a position of a center of each of the ball rolling grooves to a start point of each of the curved corners.

(4) According to the invention, there is provided a rolling die for a linear guide comprising: a rolling die body shaped like a roll, a protrusion being provided on an outer circumferential surface of the rolling die body for producing a ball rolling groove by form rolling, wherein curved corners are formed at joint portions between the surfaces of the rolling die body and the protrusion, the curved corners connecting smoothly the surface of the rolling die body to that of the protrusion.

In the above construction, it is preferable that a center of curvatures of the curved corner is disposed in an opposite side of that of the protrusion with respect to the surface of the rolling die body.

(5) According to the invention, in the rolling die for the linear guide as in (4), a curvature radius of the curved corners satisfy the relation $|r_3|<|r_2|$ in which $r_3$ is the curvature radius of the curved corners, and $r_2$ is a curvature radius of the protrusion.

(6) According to the invention, in the rolling die for the linear guide as in (4) or (5), the curved corners satisfy the condition:

$$L_B \geq \frac{\left(\alpha - \cos^{-1}\left(\frac{2f-1}{2f}\sin\alpha\right)\right)\times\pi\times f\times Da}{180} + a_0$$

$$a_0 = \mu\sqrt[3]{\frac{3\left(1-\frac{1}{m^2}\right)Q_0}{E\cdot\sum\rho}}$$

-continued $$Q_0 = 2\cdot\left(\frac{f}{2f-1}\right)^{\frac{1}{2}} Da^2$$

$$\sum\rho = \frac{4f-1}{Daf}$$

$\mu$: Hertz's coefficient

1/m: Poisson's ratio

E: Young's modulus in which Da is a diameter of a ball rolling in the ball rolling groove, f is a ratio of a curvature radius of the ball rolling groove to the diameter of the ball, $\alpha$ is a contact angle between the ball rolling groove and the ball, and $L_B$ is a distance from a position of a peak of the protrusion to a start point of each of the curved corners.

(7) According the invention, there is provided a linear guide device using a linear guide rail defined in any one of (1) through (3).

(8) According to the invention, there is provided a linear guide device using a linear guide rail manufactured by the rolling die defined in any one of (5) through (8).

DETAILED DESCRIPTION OF THE PREFERRED EMBODIMENTS

An embodiment of the invention will be described below with reference to the drawings.

Figure 1:
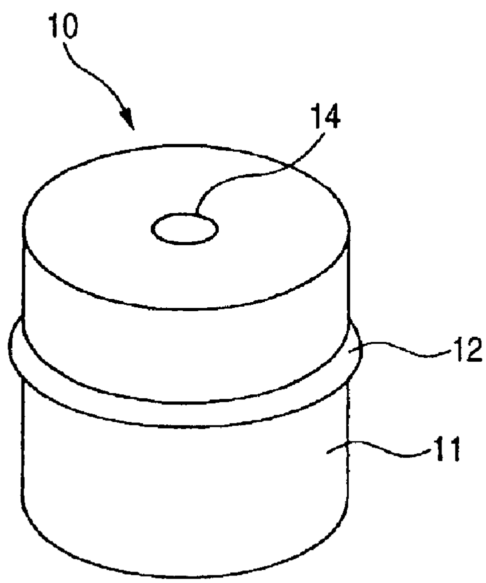
FIG. 1 is a perspective view showing a rolling die for a linear guide according to an embodiment of the invention.
Figure 2:
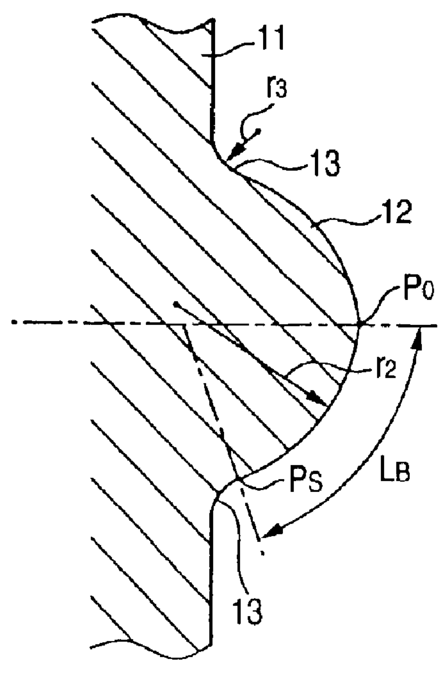
FIG. 2 is a sectional view showing part of the rolling die for the linear guide depicted in FIG. 1.

FIGS. 1 to 4, FIGS. 5A and 5B, and FIGS. 6 and 7 are views for explaining a rolling die for a linear guide according to an embodiment of the invention. FIG. 1 is a perspective view of the rolling die for the linear guide. FIG. 2 is a sectional view showing a part of the rolling die for the linear guide.

As shown in FIG. 1, the rolling die 10 for the linear guide according to this embodiment includes a rolling die body 11 shaped like a roll, and a protrusion 12 used for producing a ball rolling groove by form rolling. The protrusion 12 is formed on an outer circumferential surface of the rolling die body 11 so as to be provided on the whole circumference of the rolling die body 11. As shown in FIG. 2, curved corners 13 are formed at joint portions between the outer circumferential surface of the rolling die body 11 and the protrusion 12 so as to be provided on the whole circumference of the rolling die body 11. In FIG. 1, the reference numeral 14 designates a through-hole formed in a central portion of the rolling die body 11. The through-hole 14 is provided so that a rotary shaft for rotating the rolling die body 11 is inserted into the through-hole 14.

The curved corners 13 are connected smoothly the surfaces of the rolling die body 11 to that of the protrusion 12. A center of curvatures of the curved corner 13 is disposed in an opposite side of that of the protrusion 12 with respect to the surface of the rolling die body 11. The curved corners 13 have a curvature reverse to that of a ball rolling groove formed in the guide rail material by form rolling using the protrusion 12. The curvature radius $r_3$ of the curved corners 13 is selected to satisfy the relation $|r_3|<|r_2|$ in which $r_3$ is the curvature radius of the curved corners 13, and $r_2$ is the curvature radius of the ball rolling groove formed in the guide rail material by form rolling using the protrusion 12.

The curved corners 13 satisfy the condition:

$$L_B \geq \frac{\left(\alpha - \cos^{-1}\left(\frac{2f-1}{2f}\sin\alpha\right)\right)\times\pi\times f\times Da}{180} + a_0$$

$$a_0 = \mu\sqrt[3]{\frac{3\left(1-\frac{1}{m^2}\right)Q_0}{E\cdot\sum\rho}}$$

$$Q_0 = 2\cdot\left(\frac{f}{2f-1}\right)^{\frac{1}{2}} Da^2$$

$$\sum\rho = \frac{4f-1}{Daf}$$

$\mu$: Hertz's coefficient

1/m: Poisson's ratio

E: Young's modulus in which Da is the diameter of a ball rolling in the ball rolling groove, f is the ratio of the curvature radius of the ball rolling groove to the diameter of the ball, $\alpha$ is a contact angle between the ball rolling groove and the ball (see FIG. 7), and $L_B$ (see FIG. 2) is the distance from the peak position Po of the protrusion 12 to the start point Ps of each of the curved corners 13.

Figure 3:
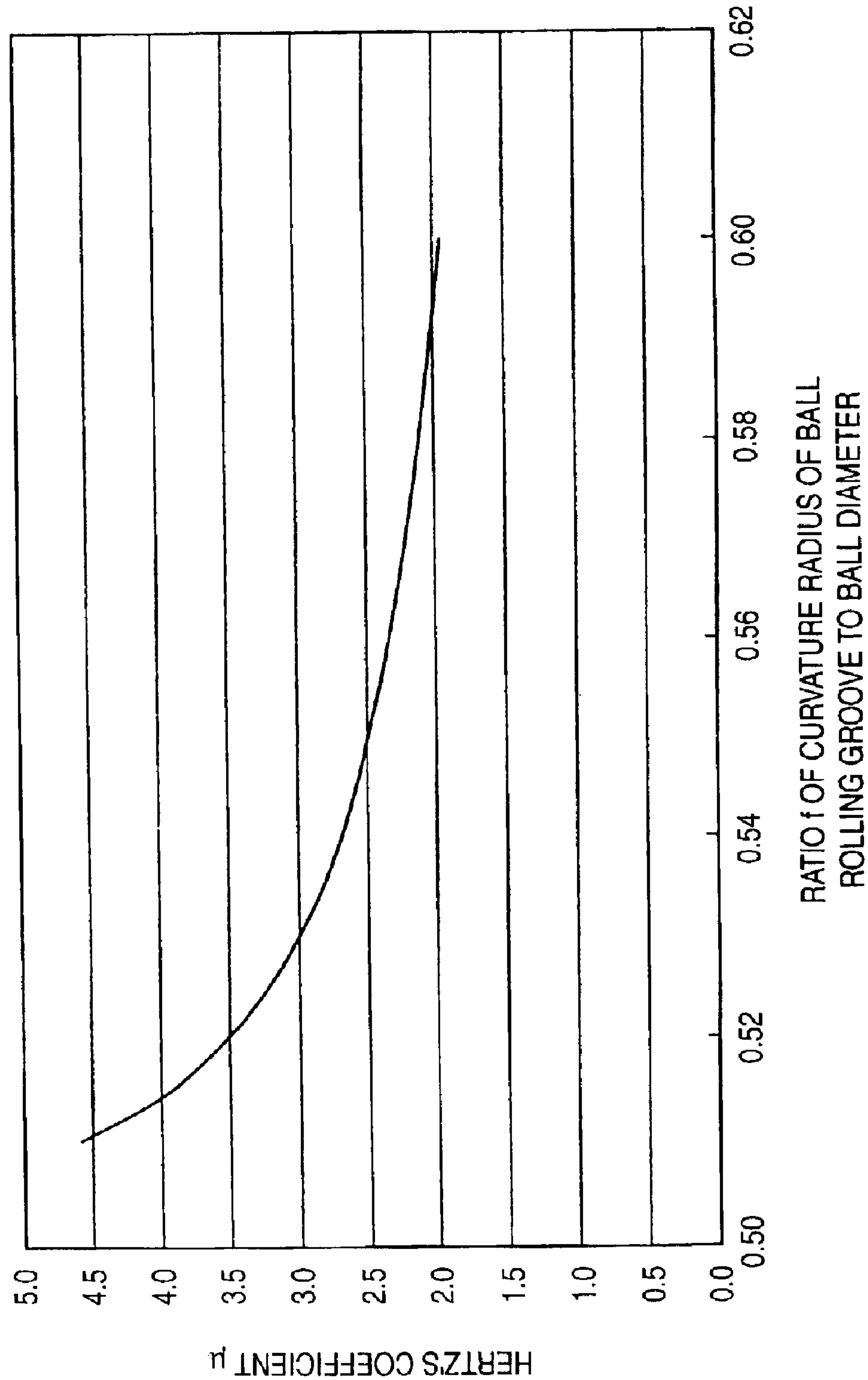
FIG. 3 is a graph showing the relation between the ratio of the curvature radius of a ball rolling groove to the diameter of a ball and the Hertz's coefficient.
Figure 4:
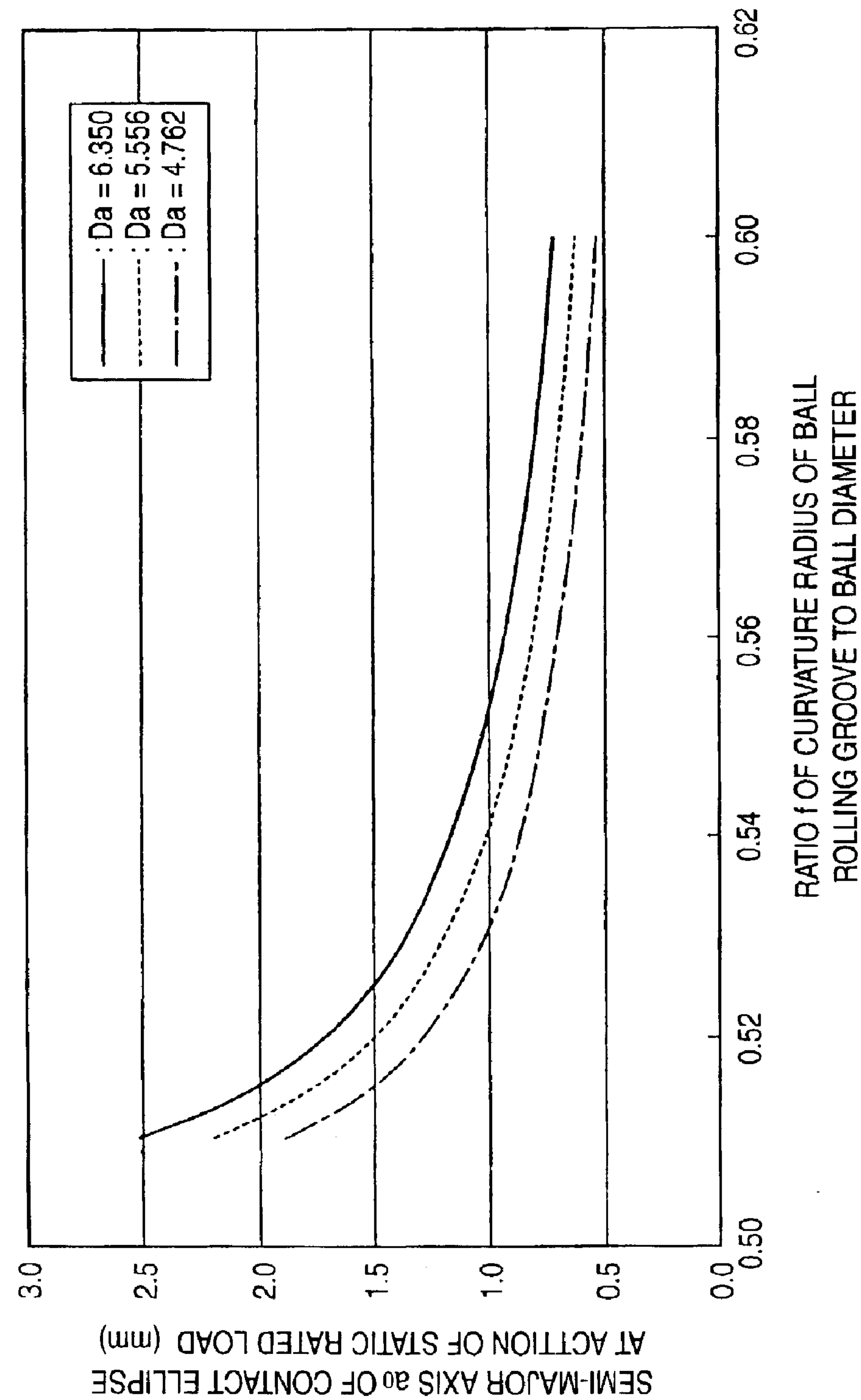
FIG. 4 is a graph showing the relation between the ratio of the curvature radius of a ball rolling groove to the diameter of a ball and the semi-major axis of a contact ellipse under a static rated load.
Figure 5A:
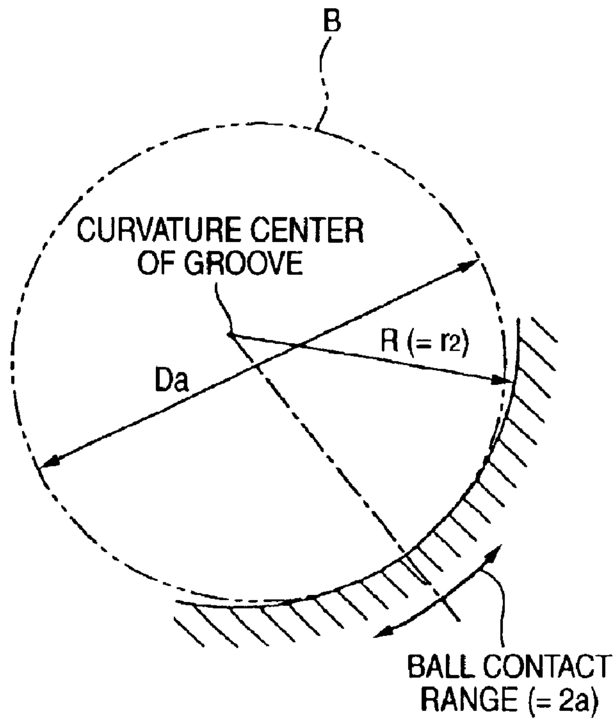
FIGS. 5A and 5B are views for explaining the semi-major axis of a contact ellipse between a ball rolling groove and a ball.
Figure 5B:
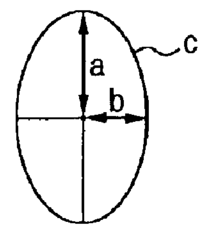

Incidentally, the Hertz's coefficient $\mu$ can be obtained from the graph shown in FIG. 3 because the Hertz's coefficient $\mu$ is decided on the basis of the ratio f of the curvature radius of the ball rolling groove to the diameter of the ball. It is obvious from FIGS. 4 and 5 that $a_0$ (semi-major axis under a static rated load when a is the semi-major axis of the contact ellipse C between the ball rolling groove and the ball B) can be decided only on the basis of the curvature radius ratio f if the diameter of the ball is decided. Hence, the right side of the equation (2) can be replaced as follows.

$$a_0 = Da \cdot \mu \cdot \sqrt[3]{\frac{6\left(1 - \frac{1}{m^2}\right)}{E} \cdot \frac{\left(\frac{f}{2f-1}\right)^{\frac{1}{2}}}{(4f-1)}} = Da \cdot \mu(f) \cdot K(f)$$

Figure 6:
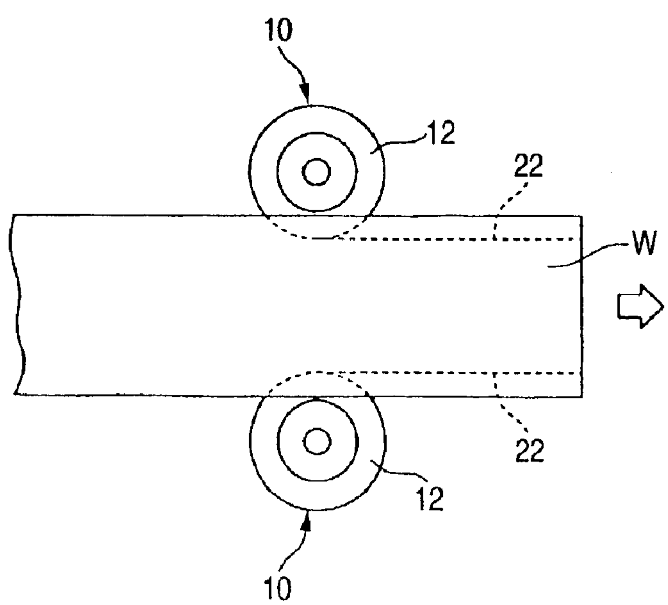
FIG. 6 is a view for explaining usage of the rolling die for the linear guide depicted in FIG. 1.
Figure 7:
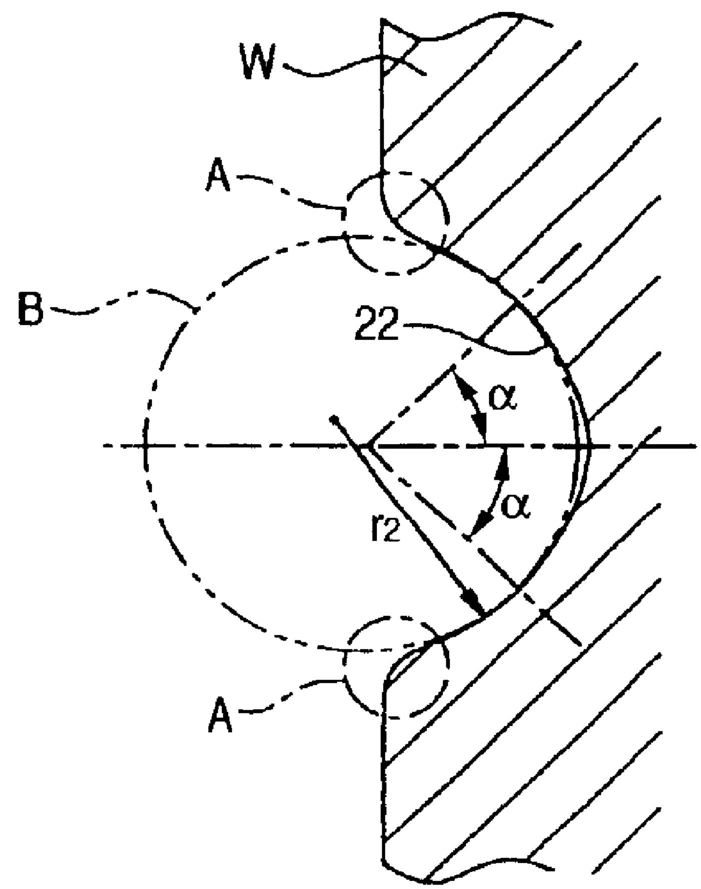
FIG. 7 is a view showing a ball rolling groove formed in a guide rail material by form rolling using the rolling die for the linear guide depicted in FIG. 1.

Such rolling dies 10 are used for forming ball rolling grooves in a guide rail material by form rolling. That is, rolling dies 10 are disposed on opposite sides of the guide rail material W as shown in FIG. 6. The guide rail material W is moved in the direction of the arrow in FIG. 6 while the side surfaces of the guide rail material W are pressed against the protrusions 12 of the rolling dies 10. As a result, the side surfaces of the guide rail material W are plastically deformed, so that ball rolling grooves 22 as shown in FIG. 7 are formed in the side surfaces of the guide rail material W by form rolling.

In this manner, curved corners 13 with a curvature reverse to that of the ball rolling grooves formed in the guide rail material by form rolling using the protrusions 12 are formed in joint portions between the outer circumferential surfaces of the rolling die bodies 11 and the protrusions 12. Hence, joint portions (A in FIG. 7) between the surfaces of the guide rail material W and the ball rolling grooves 22 are curved as shown in FIG. 7. Hence, stress can be restrained from being concentrated into the joint portions between the surfaces of the guide rail material W and the ball rolling grooves 22 because of collision with balls each entering a load portion of a slider. Hence, the ball rolling grooves can be formed in the guide rail material W by form rolling without causing lowering in durability of the guide rail and without causing lowering in the function of side seals.

The reason why the curvature radius $r_3$ of the curved corners 13 and the curvature radius $r_2$ Of the ball rolling grooves formed in the guide rail material by form rolling using the protrusion 12 satisfy the relation $|r_3|<|r_2|$ is as follows. That is, if the relation $|r_3| \geqq |r_2|$ is satisfied, the joint portions between surfaces of the guide rail material and the ball rolling grooves are shaped like forms approximating edges so that load bearing capacity supposed to be designed initially cannot be obtained (because the contact ellipse formed in each ball rolling groove is cut when a static rated load acts on the ball rolling groove) and so that stress is act to be concentrated easily, The reason why the distance $L_B$ from the peak position Po of the protrusion 12 to the start point Ps of one of the curved corners 13 is selected to be not smaller than the right side of the equation (2) is as follows. That is, if the distance $L_B$ is smaller than the right side of the equation (2), a dent larger than the design value is produced in the ball rolling groove.

Figure 8:
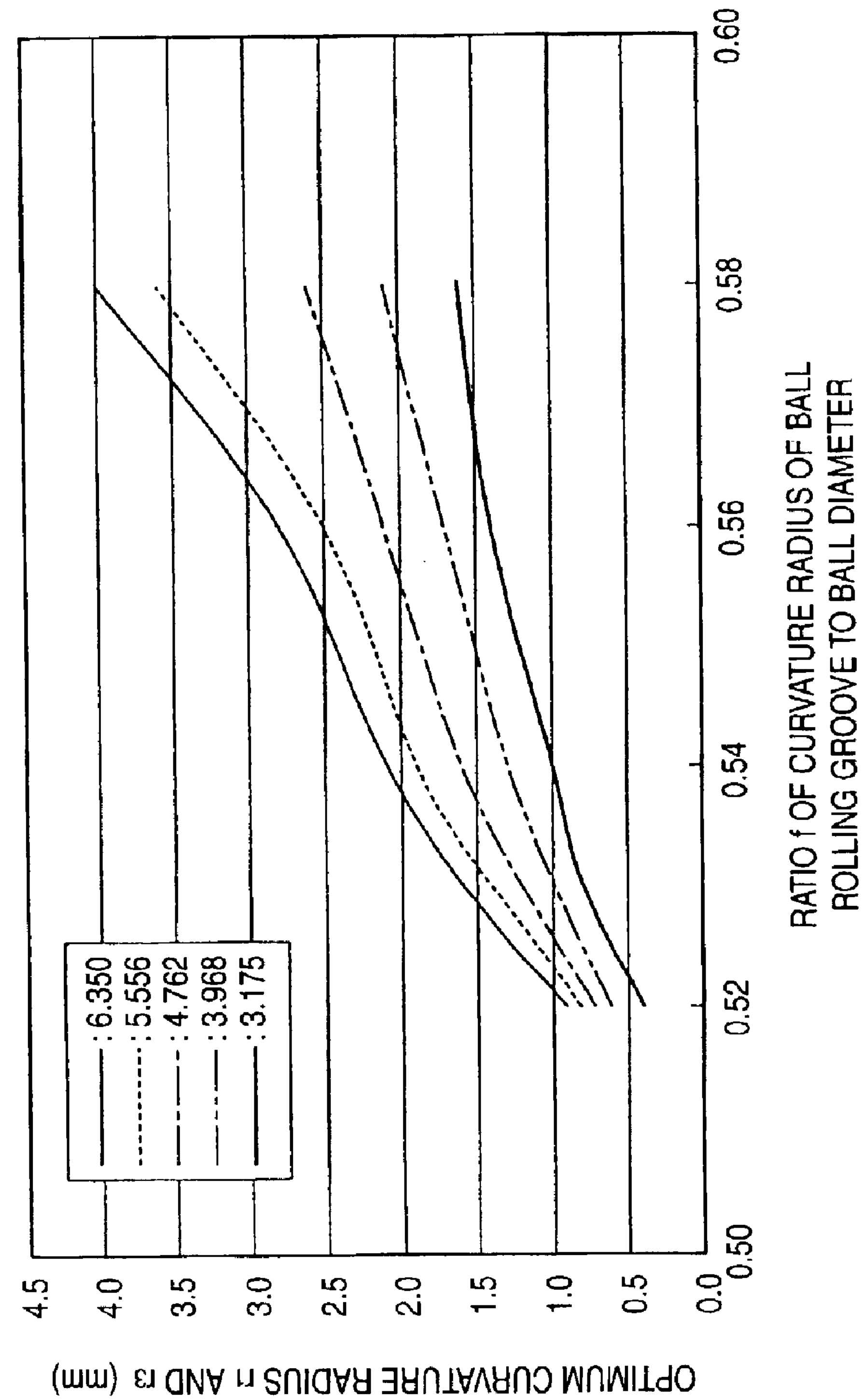
FIG. 8 is a graph showing the relation between the ratio of the curvature radius of a ball rolling groove to the diameter of a ball and the optimum curvature radius of a curved corner.

When the diameter Da of the ball is in a range of 3.175 to 6.350 mm and the ratio f of the curvature radius of the ball rolling groove to the diameter of the ball is in a range of 0.52 to 0.58, the curvature radius $r_3$ of each curved corner 13 is preferably selected to be in a range of 0.5 to 4.0 mm as shown in FIG. 8. It is further preferable that the curvature radius $r_3$ of each curved corner 13 is a curvature radius selected to intersect the outer circumferential surface of the rolling die body 11 on a line tangential to the curvature. When Da, f and $a_0$ are 6.35 mm, 0.54 and 1.16 mm respectively, the distance $L_B$ is not smaller than 3.67 mm. In this case, the curvature radius $r_3$ of each curved corner 13 is given on the basis of the following expression.

$$(r_2+r_3)^2 - \left\{\left(\frac{2r_2 - Da}{2}\right)\cos\alpha + 0.01Da + r_3\right\}^2 - \{(r_2+r_3)\sin(\alpha+\theta)\}^2 \cong 0$$

That is, the curvature radius $r_3$ of each curved corner 13 is about 2.1 mm.

Figure 9:
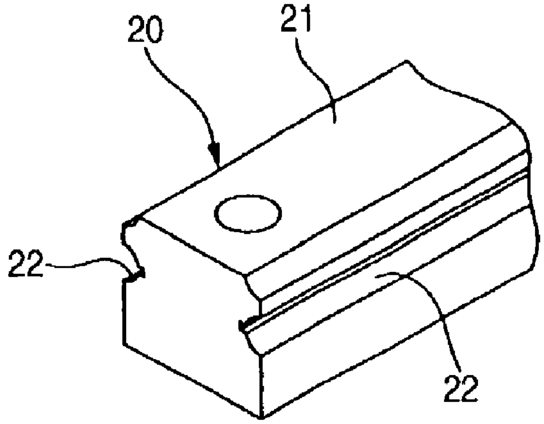
FIG. 9 is a perspective view showing a linear guide rail according to an embodiment of the invention.
Figure 10:
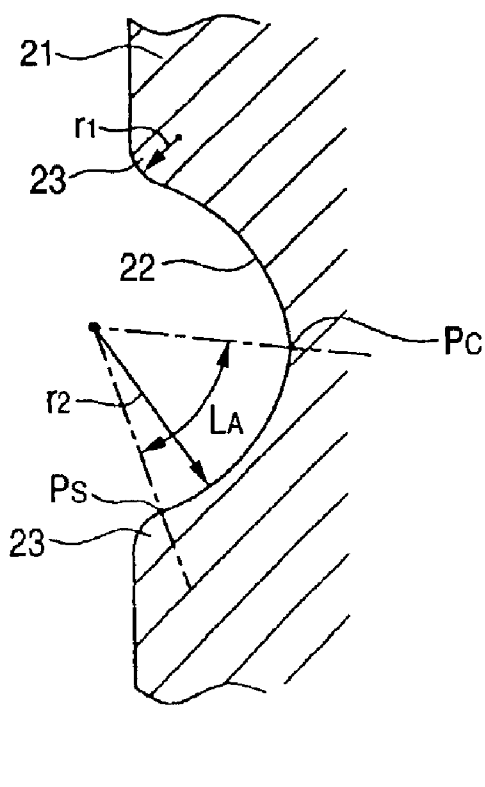
FIG. 10 is a sectional view showing part of the linear guide rail depicted in FIG. 9.
Figure 11:
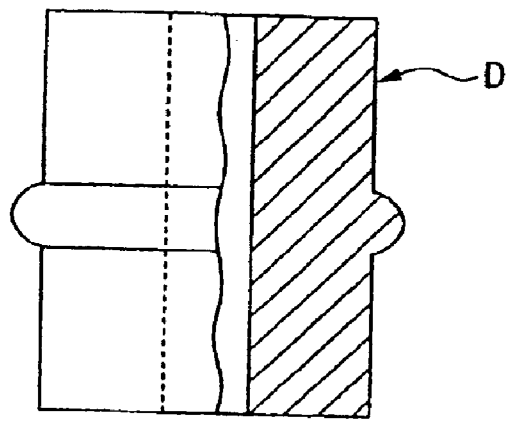
FIG. 11 is a view showing a related-art linear guide rolling die.
Figure 12:
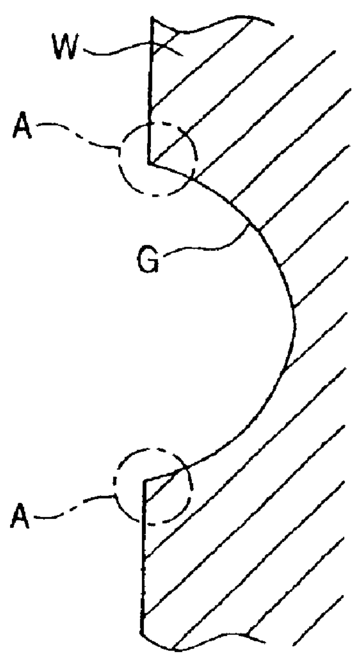
FIG. 12 is a view showing a ball rolling groove formed in a guide rail material by form rolling using the related-art linear guide rolling die.

FIGS. 9 and 10 are views for explaining a linear guide rail according to an embodiment of the invention. FIG. 9 is a perspective view of the linear guide rail. FIG. 10 is a sectional view showing part of the linear guide rail.

As shown in FIG. 9, the linear guide rail 20 according to this embodiment has a rail body 21, and straight-line ball rolling grooves 22 formed one by one in opposite side surfaces of the rail body 21 by form a rolling. As shown in FIG. 10, curved corners 23 are formed along the lengthwise direction of the rail body 21 at joint portions between the side surfaces of the rail body 21 and the ball rolling grooves 22.

The curved corners 23 are connected smoothly the surfaces of the rail body 21 to that of the ball rolling grooves 22, A center of curvatures of the curved corner 23 is disposed in an opposite side of that of the ball rolling grooves 22 with respect to the surface of the rail body 21. The curved corners 23 have a curvature reverse to that of the ball rolling grooves 22. The curvature radius $r_1$ of each curved corner 23 is selected to satisfy the relation $|r_1|<|r_2|$ in which $r_1$ is the curvature radius of the curved corner 23, and $r_2$ is the curvature radius of the ball rolling groove 22.

The curved corners 23 satisfy the condition:

$$L_A \geq \frac{\left(\alpha - \cos^{-i}\left(\frac{2f-1}{2f}\sin\alpha\right)\right)\times\pi\times f\times Da}{180} + a_0$$

$$a_0 = \mu\sqrt[3]{\frac{3\left(1-\frac{1}{m^2}\right)Q_0}{E\cdot\sum\rho}}$$

$$Q_0 = 2\cdot\left(\frac{f}{2f-1}\right)^{\frac{1}{2}} Da^2$$

$$\sum\rho = \frac{4f-1}{Daf}$$

$\mu$: Hertz's coefficient

1/m: Poisson's ratio

E; Young's modulus in which Da is the diameter of each of balls rolling in the ball rolling grooves 22, f is the ratio of the curvature radius of each of the ball rolling grooves 22 to the ball diameter Da, $\alpha$ is a contact angle between each of the ball rolling grooves and a corresponding one of the balls, and $L_A$ is the distance from the position Pc of the center of each of the ball rolling grooves 22 to the start point Ps of each of the curved corners 23 (see FIG. 10).

Incidentally, the Hertz's coefficient $\mu$ can be obtained from the graph shown in FIG. 3 because the Hertz's coefficient $\mu$ is decided on the basis of the ratio f of the curvature radius of the ball rolling groove to the diameter of the ball. It is obvious from FIGS. 4 and 5 that $a_0$ (semi-major axis under a static rated load when a is the semi-major axis of the contact ellipse C between the ball rolling groove 22 and the ball B) can be decided only on the basis of the curvature radius ratio f if the diameter of the ball is decided. Hence, the right side of the equation (4) can be replaced as follows.

$$a_0 = Da\cdot\mu\cdot\sqrt[3]{\frac{6\left(1-\frac{1}{m^2}\right)}{E}\cdot\frac{\left(\frac{f}{2f-1}\right)^{\frac{1}{2}}}{(4f-1)}} = Da\cdot\mu(f)\cdot K(f)$$

In this manner, curved corners 23 with a curvature reverse to that of the ball rolling grooves 22 are formed at joint portions between the side surfaces of the rail body 21 and the ball rolling grooves 22. Hence, the joint portions between the sides surfaces of the rail body 21 and the ball rolling grooves 22 are curved. Hence, stress can be restrained from being concentrated into the joint portions between the surfaces of the rail body 21 and the ball rolling grooves 22 because of collision with balls each entering a load portion of a slider.

The reason why the curvature radius $r_1$ of the curved corners 23 and the curvature radius $r_2$ of the ball rolling grooves 22 satisfy the relation $|r_1|<|r_2|$ is as follows. That is, if the relation $|r_1|\geqq|r_2|$ is satisfied, the joint portions between surfaces of the rail body 21 and the ball rolling grooves 22 are shaped like forms approximating edges so that load bearing capacity supposed to be designed initially cannot be obtained (because the contact ellipse formed in each ball rolling groove is cut when a static rated load acts on the ball rolling groove) and so that stress is act to be concentrated easily. The reason why the distance $L_A$ from the position Pc of the center of each ball rolling groove 22 to the start point Ps of one of the curved corners 23 is selected to be not smaller than the right side of the equation (6) is as follows. That is, if the distance $L_A$ is smaller than the right side of the equation (6), a dent larger than the design value is produced in the ball rolling groove.

When the diameter Da of the ball is in a range of 3.175 to 6.350 mm and the ratio f of the curvature radius of the ball rolling groove to the diameter of the ball is in a range of 0.52 to 0.58, the curvature radius $r_1$ of each curved corner 23 is preferably selected to be $r_1$=0.5~4.0 mm as shown in FIG. 8. It is further preferable that the curvature radius $r_1$ of each curved corner 23 is a curvature radius selected to intersect a side surface of the rail body 21 on a line tangential to the curvature. When Da, f and $a_0$ are 6.35 mm, 0.54 and 1.16 mm respectively, the distance $L_A$ is not smaller than 3.67 mm. In this case, the curvature radius $r_1$ of each curved corner 23 is given on the basis of the following expression.

$$(r_2+r_1)^2-\left\{\left(\frac{2r_2-Da}{2}\right)\cos\alpha+0.01Da+r_3\right\}^2-\{(r_2+r_1)\sin(\alpha+\theta)\}^2\cong 0$$

That is, the curvature radius $r_1$ of each curved corner 23 is about 2.1 mm.

As described above, according to the invention, joint portions between surfaces of the rail body and ball rolling grooves are curved. Hence, stress can be restrained from being concentrated into the joint portions between the surfaces of the rail body and the ball rolling grooves because of collision with balls each entering a load portion of a slider.

According to the invention, joint portions between surfaces of the guide rail material and ball rolling grooves are curved. Hence, stress can be restrained from being concentrated into the joint portions between the surfaces of the guide rail material and the ball rolling grooves because of collision with balls each entering a load portion of a slider. Hence, ball rolling grooves can be formed in the guide rail material by form rolling without causing lowering in durability of the guide rail and without causing lowering in the function of side seals.

What is claimed is:

1. A linear guide rail comprising:

a rail body, straight-line ball rolling grooves being formed in surface of the rail body wherein curved corners are formed at joint portions between the surface of the rail body and the ball rolling grooves, the curved corners connecting smoothly the surface of the rail body to that of the ball rolling grooves, and wherein the curved corners satisfy the condition:

$$L_A \geq \frac{\left(\alpha-\cos^{-1}\left(\frac{2f-1}{2f}\sin\alpha\right)\right)\times\pi\times f\times Da}{180}+a_0$$

$$a_0 = \mu\sqrt[3]{\frac{3\left(1-\frac{1}{m^2}\right)Q_0}{E\cdot\sum\rho}}$$

$$Q_0 = 2\cdot\left(\frac{f}{2f-1}\right)^{\frac{1}{2}}Da^2$$

$$\sum\rho = \frac{4f-1}{Daf}$$

$\mu$: Hertz's coefficient

1/m: Poisson's ratio

E: Young's modulus in which Da is a diameter of each of balls rolling in the ball rolling grooves f is a ratio of the curvature radius of each of the ball rolling grooves to the ball diameter, $\alpha$ is a contact angle between each of the ball rolling grooves and a corresponding one of the balls, and $L_A$ is a distance from a position of a center of each of the ball rolling grooves to a start point of each of the curved corners.

2. The linear guide rail according to claim 1, wherein a center of curvature of the curved corner is disposed in an opposite side of that of the ball rolling grooves with respect to the surface of the rail body.

3. The linear guide rail according to claim 2, wherein a curvature radius of the curved corners is selected to satisfy the relation $|r_1|<|r_2|$ in which $r_1$ is the curvature radius of the curved corners, and $r_2$ is a curvature radius of the ball rolling grooves.

4. The linear guide rail according to claim 1, wherein a curvature radius of the curved corners is selected to satisfy the relation $|r_1|<|r_2|$ in which $r_1$ is the curvature radius of the curved corners, and $r_2$ is a curvature radius of the ball rolling grooves.

5. A linear guide device using a linear guide rail defined in claim 1.

6. A rolling die for a linear guide comprising:

a rolling die body shaped like a roll, a protrusion being provided on an outer circumferential surface of the rolling die body for producing a ball rolling groove, wherein curved corners are formed at joint portions between the surfaces of the rolling die body and the protrusion, the curved corners connecting smoothly the surface of the rolling die body to that of the protrusion, and wherein the curved corners satisfy the condition:

$$L_B \geq \frac{\left(\alpha - \cos^{-1}\left(\frac{2f-1}{2f}\sin\alpha\right)\right) \times \pi \times f \times Da}{180} + a_0$$

$$a_0 = \mu \sqrt[3]{\frac{3\left(1 - \frac{1}{m^2}\right)Q_0}{E \cdot \sum \rho}}$$

$$Q_0 = 2 \cdot \left(\frac{f}{2f-1}\right)^{\frac{1}{2}} Da^2$$

$$\sum \rho = \frac{4f-1}{Daf}$$

$\mu$: Hertz's coefficient

1/m: Poisson's ratio

E: Young's modulus in which Da is a diameter of each of balls rolling in the ball rolling grooves, f is a ratio of the curvature radius of each of the ball rolling grooves to the ball diameter, $\alpha$ is a contact angle between each of the ball rolling grooves and a corresponding one of the balls, and $L_B$ is a distance from a position of a center of each of the ball rolling grooves to a start point of each of the curved corners.

7. The rolling die according to claim 6, wherein a center of curvature of the curved corner is disposed in an opposite side of that of the protrusion with respect to the surface of the rolling die body.

8. The rolling die for a linear guide according to claim 7, wherein a curvature radius of the curved corners satisfy the relation $|r_3|<|r_2|$ in which $r_3$ is the curvature radius of the curved corners, and $r_2$ is a curvature radius of the protrusion.

9. The rolling die for a linear guide according to claim 6, wherein a curvature radius of the curved corners satisfy the relation $|r_3|<|r_2|$ in which $r_3$ is the curvature radius of the curved corners, and $r_2$ is a curvature radius of the protrusion.

10. A linear guide device using a linear guide rail manufactured by the rolling die defined in claim 6.

* * * * *